Oct. 28, 1969     P. O. COX ET AL     3,474,988
POD FOR A GAS TURBINE ENGINE
Filed Dec. 11, 1967
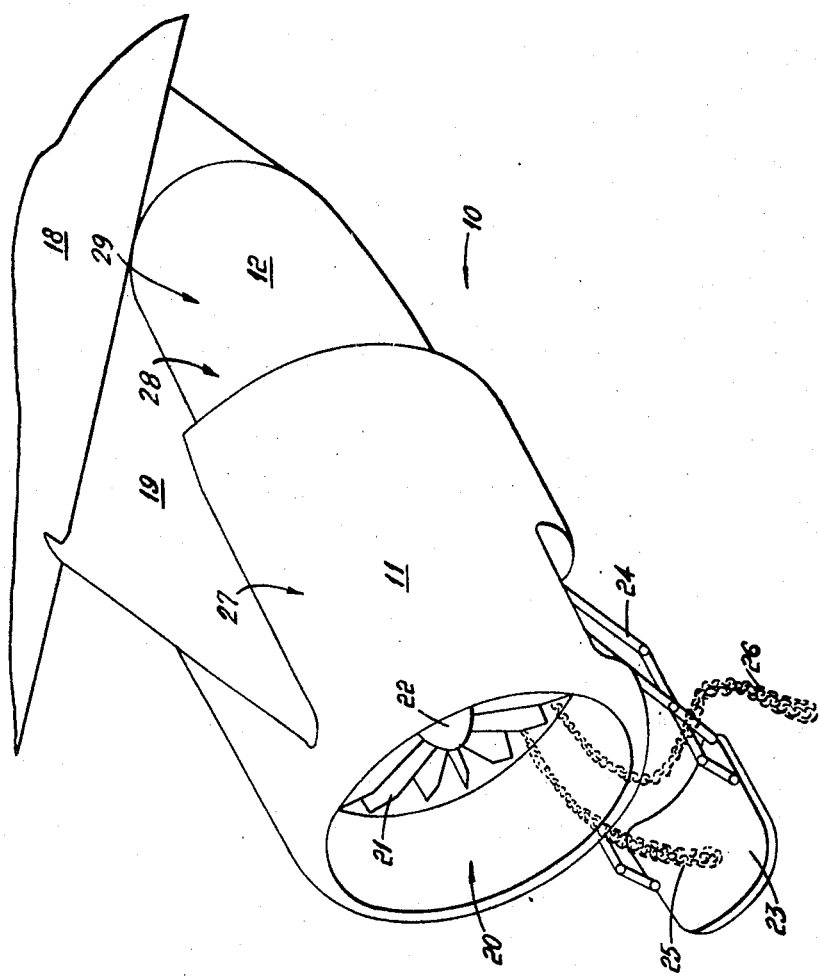
Inventors
Peter Oliver Cox
James William Cundall
By
Cushman, Darby & Cushman
Attorneys United States Patent Office 3,474,988
Patented Oct. 28, 1969

3,474,988
POD FOR A GAS TURBINE ENGINE
Peter Oliver Cox, Nottingham, and James William Cundall, Derby, England, assignors to Rolls-Royce Limited, Derby, England, a British company
Filed Dec. 11, 1967, Ser. No. 689,614
Claims priority, application Great Britain, Jan. 17, 1967, 2,495/67
Int. Cl. B64d 33/02, 27/12
U.S. Cl. 244—53      3 Claims

ABSTRACT OF THE DISCLOSURE

The invention concerns a gas turbine engine pod for aircraft in which ingestion of debris is reduced, the pod, e.g. a front fan pod, having a part-cylindrical panel which can swing down from the pod and forwardly thereof, whereby the primary intake vortex caused by rotation of the engine terminates on the panel and not on the ground.

---

This invention relates to pods for gas turbine engines.

A frequent problem which occurs with gas turbine engines mounted on aircraft is the necessity of prevention of debris ingestion at the engine air intake when the engine is ground tested, or run at take-off and landing. Any debris ingested from the ground and passing into the engine can cause very serious damage by e.g. breaking rotor blades. The problem is aggravated on those aircraft where the gas turbine engines are slung under the wings of the aircraft, thereby causing the engines to be nearer to the ground than in the case of fuselage-mounted engines. The problem is aggravated further in the case of the front-fan type engines, i.e. engines in which there is a fan rotor upstream of, and of larger diameter than, the compressor means, or where the compressor means carries the fan rotor. In either case, the provision of the fan rotor enlarges the frontal area for the engine, thus bringing the engine, and the suction forces caused by rotation of the fan and the compressor means, even nearer to the ground, and enhancing the possibility of debris ingestion.

The present invention seeks to reduce or substantially eliminate the above problem.

According to the present invention, there is provided a pod for a gas turbine engine comprising a fixed pod portion and a solid panel which is mounted in the part of the pod adapted to be nearest to the ground when the pod is installed in an aircraft, the panel being movable between a first position in which it forms with said fixed pod portion a substantially continuous uninterrupted air intake structure, and a second position in which said panel projects forwardly and below the upstream edge of the fixed pod portion so as to present to the air intake a debris-free surface from which, in operation of the said engine, a vortex of air is sucked into the engine, and powered means for effecting movement of the said panel.

The powered means may include a ram-actuated lazy-tongs like linkage, the said panel being pivotally connected to said linkage.

The invention also includes a gas turbine engine having a pod as set forth above.

The gas turbine engine may be a front fan engine and said pod may be a fan pod.

The invention further includes an aircraft provided with at least one gas turbine engine as set forth above.

The invention is illustrated, merely by way of example, in the accompanying drawing, which is a perspective view of a pod for a gas turbine fan engine which is mounted on an aircraft, the pod members being shown in their second or operative position.

Referring to the drawing, there is shown a pod 10 slung under the wing 18 of an aircraft by means of a pylon 19. In the pod 10 is mounted a gas turbine front fan engine having an air intake 20, air intake guide vanes 21 and a nose bullet 22, the rest of the fan engine, such as the compressor means, combustion means and turbine means in flow series, the same being diagrammatically referred to by the numerals 27, 28 and 29. The pod 10 comprises a fan pod portion 11 and a portion 12 which surrounds the rest of the engine and which is of smaller diameter than the portion 11.

The portion 11 is fixed and is formed with a part-cylindrical panel 23 which is movable between a first or inoperative position in which it is fully retracted into the portion 11 to form a continuous and uninterrupted position therewith (not shown), and a second or operative position in which the panel 23 is swung downwardly and forwardly of the pod 10 (as seen in FIGURE 3) to form a gap 27 therein.

As shown, the panel 23 has secured thereto a number of pivoted links 24 of the "lazy-tongs" type which are actuated by rams (not shown), the links 24 being effective in moving the panel 23 between its first and second positions.

In operation, when the front fan engine mounted on the pylon 19 is ground tested or run for take-off or landing, the links 24 are actuated to swing the panel 23 to its position shown in the figure. In this position the panel 23 is forwardly of the fan intake 20. The suction of the rotating fan of the engine causes a primary vortex 25 of air and one or more secondary vortex 26 (one only being shown) of air to be formed, the two vortices 25, 26 being shown in dark shading. As can be seen, the primary vortex 25, which is much stronger than the secondary vortex 26, starts on the upper surface of the panel 23 where there is no debris which could be ingested. The secondary vortex 26 starts on the ground (not shown) but is arranged to have insufficient strength to ingest any damaging debris into the engine air intake 20.

Although the invention has been described with regard to a front fan turbine engine, it will be appreciated that it is equally applicable to substantially all kinds of gas turbine engines.

We claim:
1. A gas turbine engine for an aircraft comprising a front fan, compressor means, combustion means, and turbine means in flow series; and a fixed pod for said front fan, said fixed pod having a part arranged to be nearest the ground when the pod is installed on the aircraft, a solid panel mounted in the part of said fixed pod, said panel being movable between a first position in which it forms with said fixed pod a substantially continuous uninterrupted air intake structure, and a second position in which said panel projects forwardly and below the upstream edge of the fixed pod so as to present to the air intake a debris-free surface from which, in operation of the engine, a vortex of air is sucked into the engine, and actuating means for effecting movement of said panel between said first and second positions.

2. A pod for a gas turbine engine comprising a fixed pod portion having a part arranged to be nearest the ground when the pod is installed on an aircraft, a solid panel mounted in said part of the fixed pod, said panel being movable between a first position in which it forms with said fixed pod portion a substantially continuous uninterrupted air intake structure, and a second position in which said panel projects forwardly and below the upstream edge of the fixed pod portion so as to present to the air intake a debris-free surface from which, in operation of the engine, a vortex of air is sucked into the engine, and actuating means for effecting movement of said panel between said first and second positions.

3. A pod as claimed in claim 2 wherein said actuating means includes a lazy-tong-like linkage, said panel being pivotally connected to said linkage.

References Cited

UNITED STATES PATENTS

| | | | |
|---|---|---|---|
| 2,976,952 | 3/1961 | Holland | 60—39.09 X |
| 2,999,656 | 9/1961 | Ward | 244—53 X |
| 3,058,693 | 10/1962 | Doak | 244—23 |
| 3,168,999 | 2/1965 | Warren et al. | 244—53 |
| 3,329,377 | 7/1967 | Peterson et al. | 60—39.09 X |
| 3,400,902 | 9/1968 | King | 244—53 |

MILTON BUCHLER, Primary Examiner

JAMES E. PITTENGER, Assistant Examiner

U.S. Cl. X.R.

60—39.09